(12) United States Patent
Spitz

(10) Patent No.: US 10,638,662 B2
(45) Date of Patent: May 5, 2020

(54) DISCHARGE SHROUD DEVICE FOR MOWER DECK

(71) Applicant: KUBOTA CORPORATION, Osaka (JP)

(72) Inventor: David Spitz, Atlanta, GA (US)

(73) Assignee: KUBOTA CORPORATION, Osaka (JP)

( * ) Notice: Subject to any disclaimer, the term of this patent is extended or adjusted under 35 U.S.C. 154(b) by 6 days.

(21) Appl. No.: 15/700,500

(22) Filed: Sep. 11, 2017

(65) Prior Publication Data

US 2019/0075723 A1 Mar. 14, 2019

(51) Int. Cl.
| | |
|---|---|
| *A01D 34/71* | (2006.01) |
| *A01D 34/81* | (2006.01) |
| *A01D 42/00* | (2006.01) |
| *A01D 34/00* | (2006.01) |
| *A01D 101/00* | (2006.01) |

(52) U.S. Cl.
CPC ........... *A01D 34/71* (2013.01); *A01D 34/005* (2013.01); *A01D 34/81* (2013.01); *A01D 42/005* (2013.01); *A01D 2101/00* (2013.01)

(58) Field of Classification Search
CPC ..................................................... A01D 34/71
See application file for complete search history.

(56) References Cited

U.S. PATENT DOCUMENTS

| | | | |
|---|---|---|---|
| 6,874,309 B1 | 4/2005 | Bellis, Jr. | |
| 6,971,224 B1 * | 12/2005 | Hancock | A01D 34/71 56/255 |
| 7,775,027 B2 * | 8/2010 | Wang | A01D 34/71 56/320.2 |
| 2010/0031620 A1 * | 2/2010 | Uemura | A01D 34/71 56/11.8 |
| 2010/0043379 A1 * | 2/2010 | Imanishi | A01D 34/71 56/320.2 |

* cited by examiner

*Primary Examiner* — Alicia Torres
(74) *Attorney, Agent, or Firm* — Greenblum & Bernstein, P.L.C.

(57) ABSTRACT

A discharge shroud device includes a cover element extending outward from a side of a mower deck for covering a discharge opening defined at the side of the mower deck, a shroud support unit for attaching the cover element to the mower deck, a blocking plate provided in the cover element to be swingable between an open position in which the discharge opening is opened and a closed position in which the discharge opening is closed, and an open-position fixing element for fixing the blocking plate to the cover element at the open position.

13 Claims, 4 Drawing Sheets

US 10,638,662 B2

DISCHARGE SHROUD DEVICE FOR MOWER DECK

TECHNICAL FILED

The disclosure relates to a discharge shroud device for a side discharge mower deck.

BACKGROUND ART

An example of existing lawn mowers is provided with a side discharge mower deck including a discharge shroud extending outward from a grass clippings discharge opening. The discharge shroud may be fixed to the mower deck or may be switchable between a raised position in which the shroud stands upright and a lowered use position in which the shroud extends laterally outward.

U.S. Pat. No. 6,874,309 discloses a mower deck including a discharge shroud and a baffle plate (blocking plate) disposed at a discharge opening of the mower deck. The discharge shroud is pivotable through a shroud hinge mechanism fixed to the mower deck between a raised position in which the shroud stands upright and a lowered use position in which the shroud extends laterally outward from the mower deck. The baffle plate (blocking plate) is pivotable through a plate hinge mechanism fixed to the mower deck between an open position in which the discharge opening is open and a closed position in which the discharge opening is closed. A swing angle of the baffle plate is adjusted by a link-type swing adjustment mechanism independently of the discharge shroud. This mower deck, in which the discharge shroud and the baffle plate are supported to a top plate of the deck around the discharge opening via the different hinge mechanisms, has a complicated structure around the discharge opening.

SUMMARY OF DISCLOSURE

The disclosure provides an improved discharge shroud device with a simple structure for a side discharge mower deck.

The discharge shroud device includes a cover element extending outward from a side of the mower deck for covering a discharge opening defined at the side of the mower deck, a shroud support unit for attaching the cover element to the mower deck, a blocking plate provided in the cover element to be swingable between an open position in which the discharge opening is opened and a closed position in which the discharge opening is closed, and an open-position fixing element provided between the cover element and the blocking plate to fix the blocking plate at the open position.

With the above arrangement in which the blocking plate is pivotably attached to the cover element corresponding to the existing discharge shroud, the mower deck only includes the shroud support unit for attaching the cover element to the mower deck to be swingable. Further, the connecting area between the blocking plate and the cover element is invisible from the outside, which provides a good appearance in the connecting area between the mower deck and the cover element. Additionally, the open-position fixing element, which secures the blocking plate in the open position to the cover element, hardly has an adverse effect on the appearance of the mower deck.

In some embodiments, the blocking plate is connected to the cover element through a living hinge. The use of the living hinge makes it possible to manufacture the blocking plate and the cover element as an integral unit made of the same material, which provides a simple swing structure and brings benefits in manufacturing cost. When the open-position fixing element includes a snap-fit structure having a snap pin and a snap hole for receiving the snap pin, the snap pin also can be formed integrally with the blocking plate, which is cost-advantageous.

DETAILED DESCRIPTION

Figure 1:
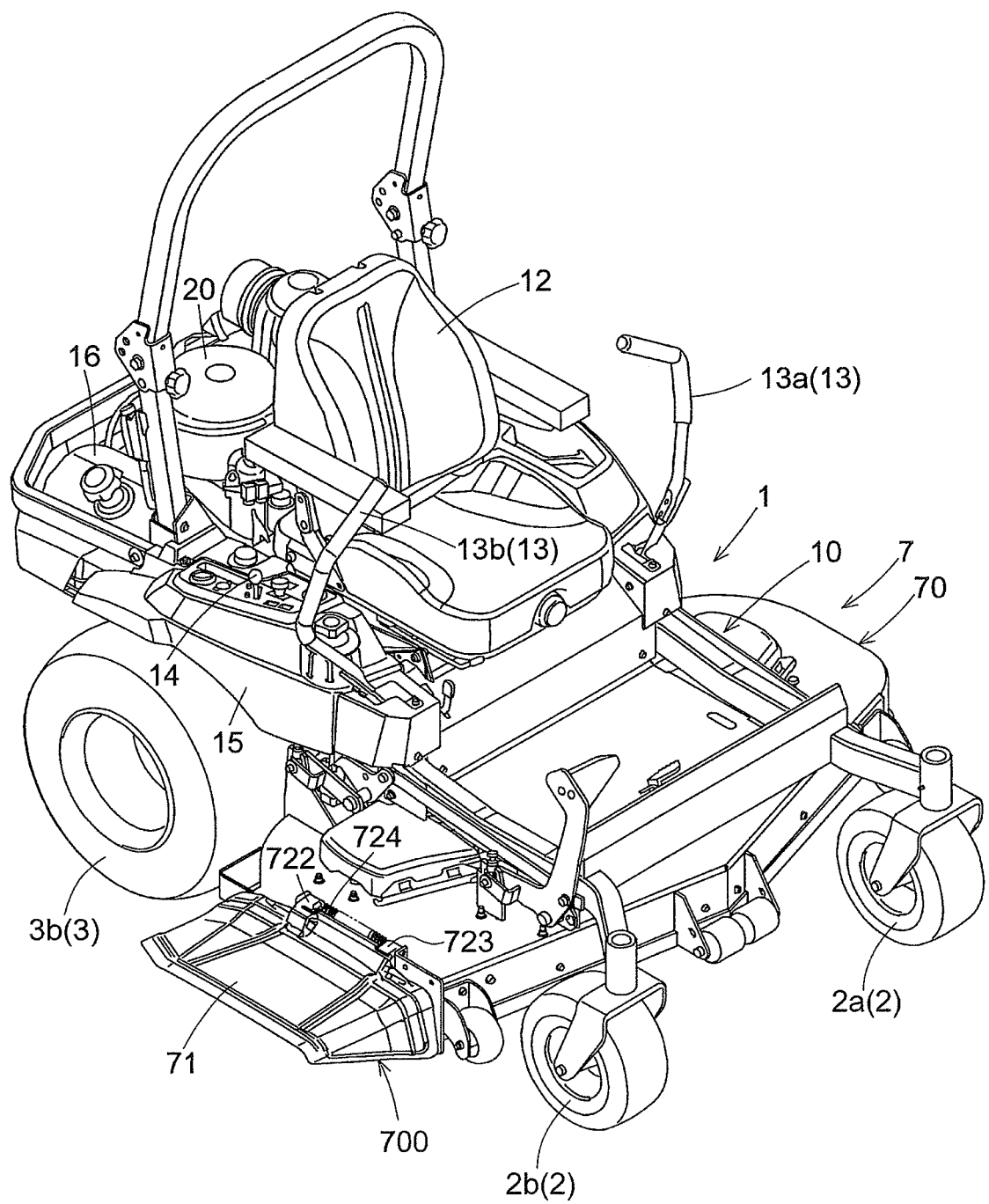
FIG. 1 is a perspective view of a lawn mower.

A lawn mower provided with a discharge shroud device 700 will be described hereinafter in reference to the accompanying drawings. Through the description, the term "front" represents a forward side in a vehicle front-to-rear direction (vehicle propelling direction), the term "rear" represents a rearward side in the vehicle front-to-rear direction, the term "lateral (laterally)" or "transverse (transversely)" represents a vehicle width direction perpendicular to the vehicle front-to-rear direction, and the terms such as "up (upper; upward; above)" and "down (lower; downward; under)" are used in reference to a vertical direction to indicate a relative height from the ground, unless defined otherwise.

The lawn mower includes a front wheel unit 2 acting as a caster unit, a rear wheel unit 3 acting as a propelling unit, and a vehicle body 1 supported to the ground by the front wheel unit 2 and the rear wheel unit 3. The lawn mower is a zero turning radius mower, in which a left rear wheel 3a and a right rear wheel 3b constituting the propelling unit 3 are controllable independently of each other in forward and reverse rotation speed. The front wheel unit 2 has a pair of right and left front wheels 2a and 2b. The vehicle body 1 includes a frame 10 made of square pipes, for example, as a primary component. The lawn mower further includes a mower unit 7 suspended from the frame 10 between the front wheel unit 2 and the rear wheel unit 3 to be vertically movable.

The mower unit 7 includes a side discharge mower deck 70, and a discharge shroud device 700 mounted on a side of the mower deck 70 for discharging grass clippings.

A driver's seat 12 is mounted on a central part of the frame 10 extending in the vehicle front-to-rear direction. A floor plate is placed on a top surface of a front part of the frame 10 to act as a driver's foot rest. An internal combustion engine 20 and engine auxiliary machinery are provided in a rear part of the frame 10. The engine 20 is used as a sole rotary power source. The engine 20 includes an engine output shaft 21 projecting downward (see FIG. 2). A fuel tank 16 is mounted on a lateral side of the engine 20.

Fenders 15 are provided in lateral opposite sides of the driver's seat 12. User control devices such as various control levers and control buttons are arranged on top surfaces of the fenders 15. An arched roll-over protection structure (ROPS) 17 is provided upright rearwardly of the driver's seat 12.

A steering unit 13, which is one of the user control devices, includes a left steering lever 13a disposed in a left side of the driver's seat 12, and a right steering lever 13b disposed in a right side of the driver's seat 12. While the left steering lever 13a is used for adjusting the rotation speed of the left rear wheel 3a, the right steering lever 13b is used for adjusting the rotation speed of the right rear wheel 3b. The left steering lever 13a and the right steering lever 13b are pivotable over a forward-drive shift range, a neutral, and a reverse-drive shift range.

Figure 2:
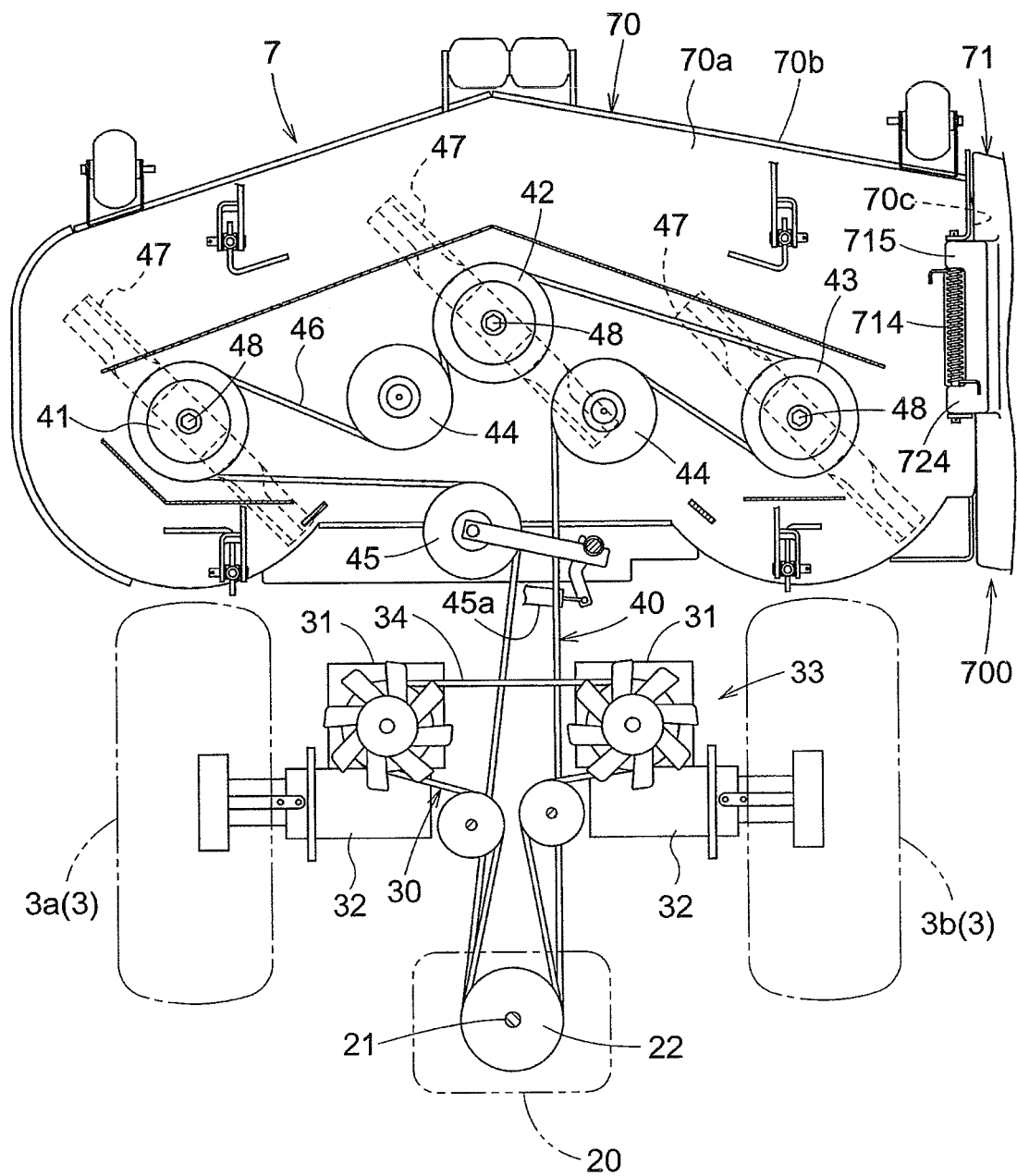
FIG. 2 is a schematic view of a power transmission system of the lawn mower.
Figure 3:
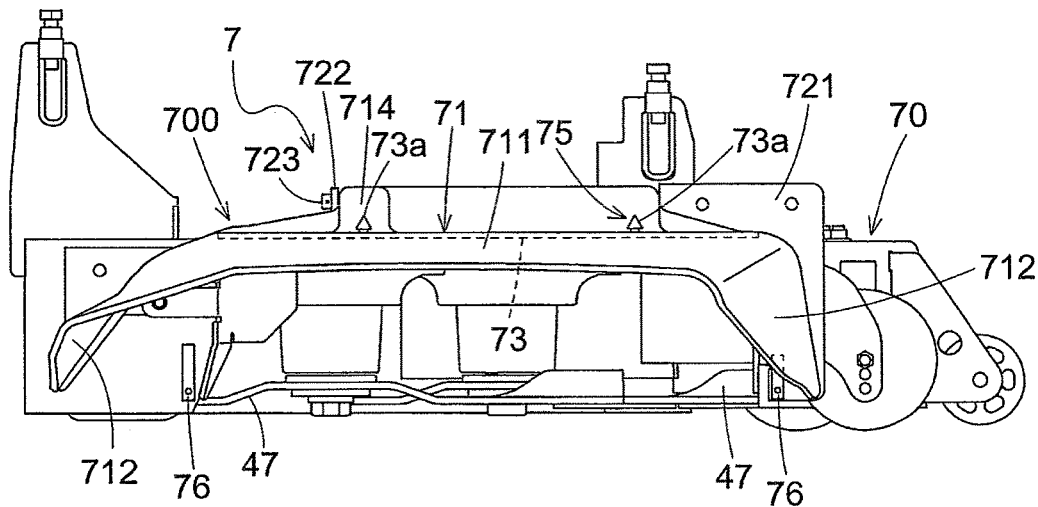
FIG. 3 is a right side view of a discharge shroud device with a blocking plate being at an open position.

As schematically shown in FIG. 2, a power transmission system includes a propelling transmission mechanism 30 for transmitting engine power to the propelling unit 3, and a work-implement transmission mechanism 40 for transmitting engine power to the mower unit 7. The power from the engine 20 is outputted from vertically arranged two output pulleys 22 attached to the engine output shaft 21.

The propelling transmission mechanism 30 includes a pair of right and left hydrostatic transmissions (HSTs) 31, a pair of right and left gear transmission mechanisms 32, and a propelling-belt transmission mechanism 33. The propelling-belt transmission mechanism 33 transmits a driving force outputted from the output pulleys 22 to the HSTs 31 via a propelling belt 34. The gear transmission mechanisms 32 transmit the driving force changed at the HSTs 31 to the propelling unit 3 (the left rear wheel 3a and the right rear wheel 3b).

The left HST 31 and the right HST 31 change speed based on control signals produced by pivoting the left steering lever 13a and the right steering lever 13b, respectively. The left steering lever 13a and the right steering lever 13b are controlled by the user to produce a stop state, a straight traveling state, a gentle turn state, a pivot turn state, and a spin turn state. The stop state is produced with the left rear wheel 3a and the right rear wheel 3b being stopped, the straight traveling state is produced with the left rear wheel 3a and the right rear wheel 3b rotating forwardly or reversely at the same speed, the gentle turn state is produced with the left rear wheel 3a and the right rear wheel 3b rotating forwardly or reversely at different speeds, the pivot turn state is produced with one of the left rear wheel 3a and the right rear wheel 3b being stopped and with the other of the left rear wheel 3a and the right rear wheel 3b rotating forwardly or reversely, and the spin turn state is produced with one of the left rear wheel 3a and the right rear wheel 3b rotating forwardly and with the other of the left rear wheel 3a and the right rear wheel 3b rotating reversely.

As understood from FIG. 2, the mower deck 70 has a top plate 70a and side plates 70b formed of a front plate, a rear plate, and a left side plate. Thus, the mower deck 70 is open at the right side thereof to provide a discharge opening 70c.

As schematically shown in FIG. 2, three cutting blades 47 are arranged in a vehicle transverse direction in the interior of the mower deck 70. The cutting blades 47 are fixed and correspond one-to-one to driving shafts 48 supported by the top plate 70a of the mower deck 70. The work-implement transmission mechanism 40 transmits the driving force to each driving shaft 48 from the output pulleys 22 of the engine 20. The work-implement transmission mechanism 40 is formed as a work-implement belt transmission mechanism including input pulleys 41 to 43 fixed to and corresponding one-to-one to the driving shafts 48 of the blades 47, reorientation pulleys 44, a tension clutch pulley 45 acting as a work-implement clutch, and a work-implement belt 46 wound around these pulleys. This arrangement allows each blade 47 to rotate in proportion to the engine speed. The tension clutch pulley 45 is switched to an engaged state or a disengaged state by a clutch solenoid 45a.

The discharge shroud device 700 will be described hereinafter in more detail in reference to FIGS. 3 to 7.

The discharge shroud device 700 includes a cover element 71, a shroud support unit 72, a blocking plate 73, and an open-position fixing element 75.

Figure 5:
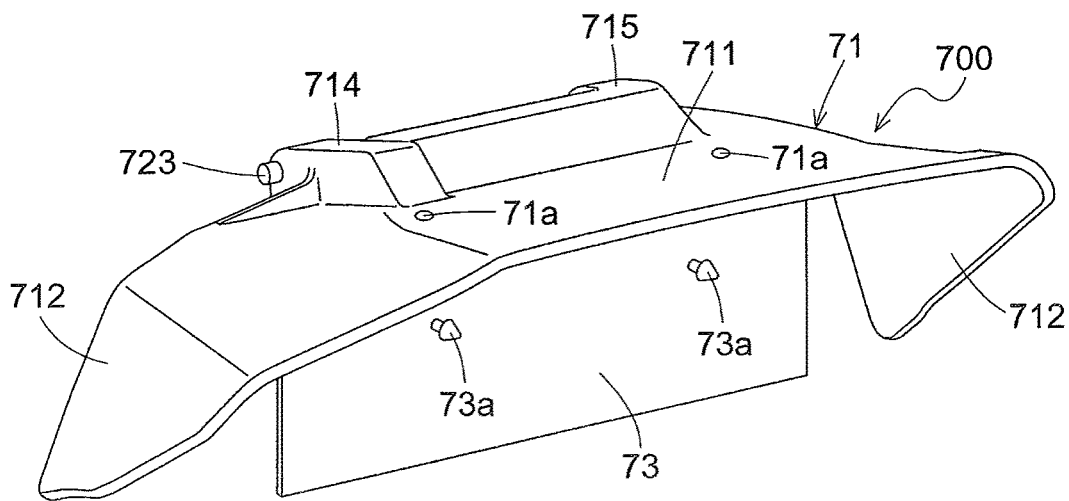
FIG. 5 is a perspective view of the discharge shroud device with the blocking plate being at the closed position.
Figure 6:
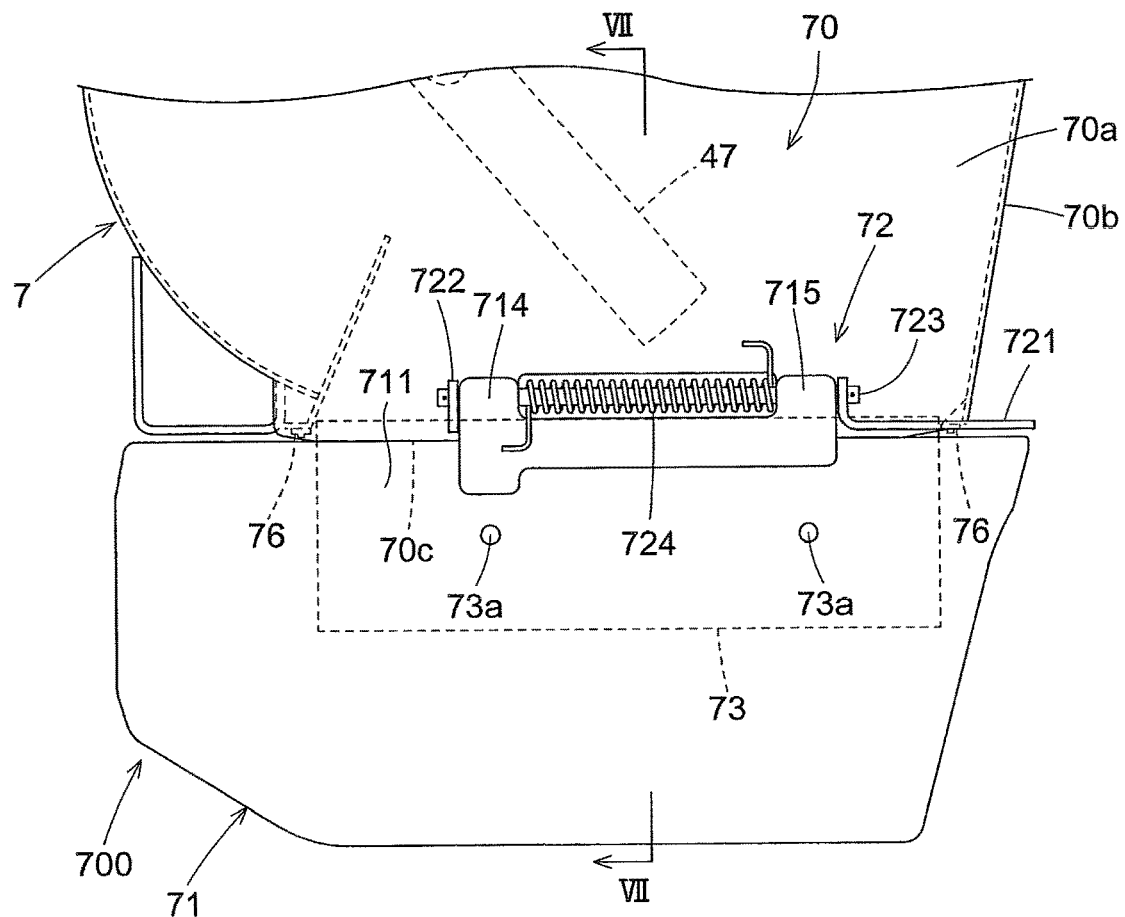
FIG. 6 is a top plan view of the discharge shroud device with the blocking plate being at the open position.
Figure 7:
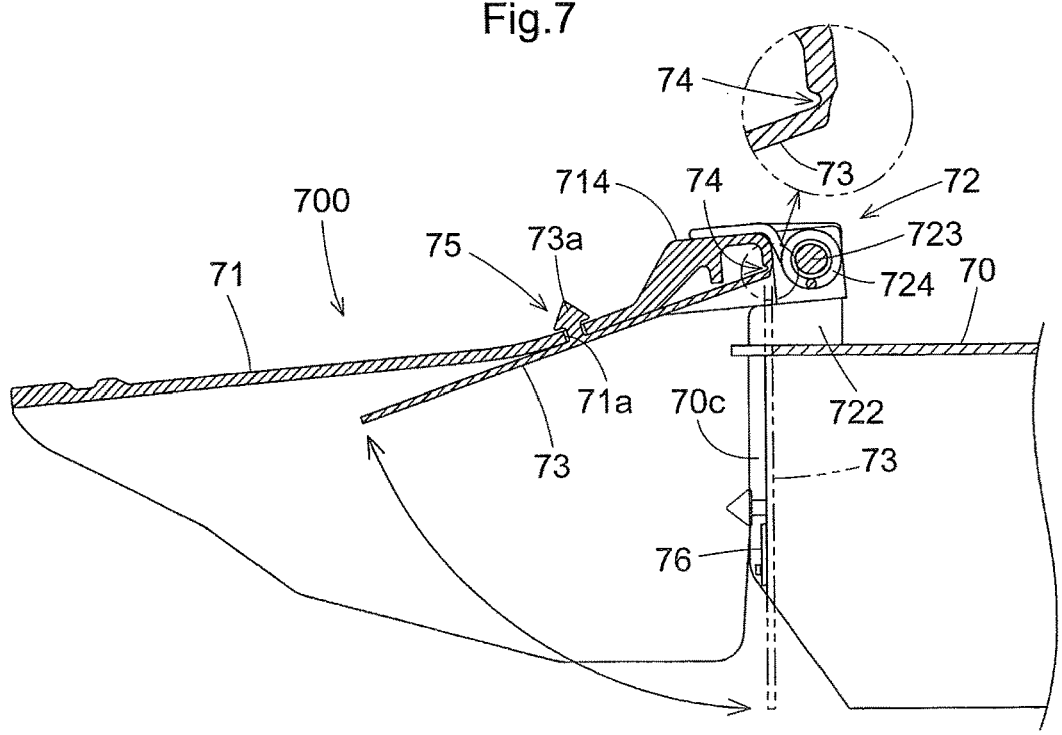
FIG. 7 is a vertical sectional view of the discharge shroud device with the blocking plate being at the open position.

As understood from FIGS. 1, 5 and 7, the cover element 71 has arched shape as a whole to guide grass clippings from the discharge opening 70c laterally outward. The cover element 71 includes a flat, substantially rectangular roof 711, and wings 712 slanting downward from opposite ends of the roof 711. The cover element 71 is supported to be swingable by the top plate 70a of the mower deck 70 through the shroud support unit 72. The shroud support unit 72 has a hinge shaft 723 supported by a first bracket 721 and a second bracket 722, both of which are fixed to the mower deck 70. A first boss portion 714 and a second boss portion 715 are spaced apart from each other at an edge part of the roof 711 of the cover element 71. The hinge shaft 723 extends through the first boss portion 714 and the second boss portion 715. This arrangement allows the cover element 71 to be swingable between a horizontal position and an upright position. The cover element 71 is urged in the horizontal direction by the action of a spring 724 provided between the first boss portion 714 and the second boss portion 715 and surrounding the hinge shaft 723. The cover element 71 in the horizontal position covers the discharge opening 70c from above to prevent grass clippings discharged from the discharge opening 70c from being expelled upward. The cover element 71 is maintained in the upright position by an unillustrated lock mechanism.

Figure 4:
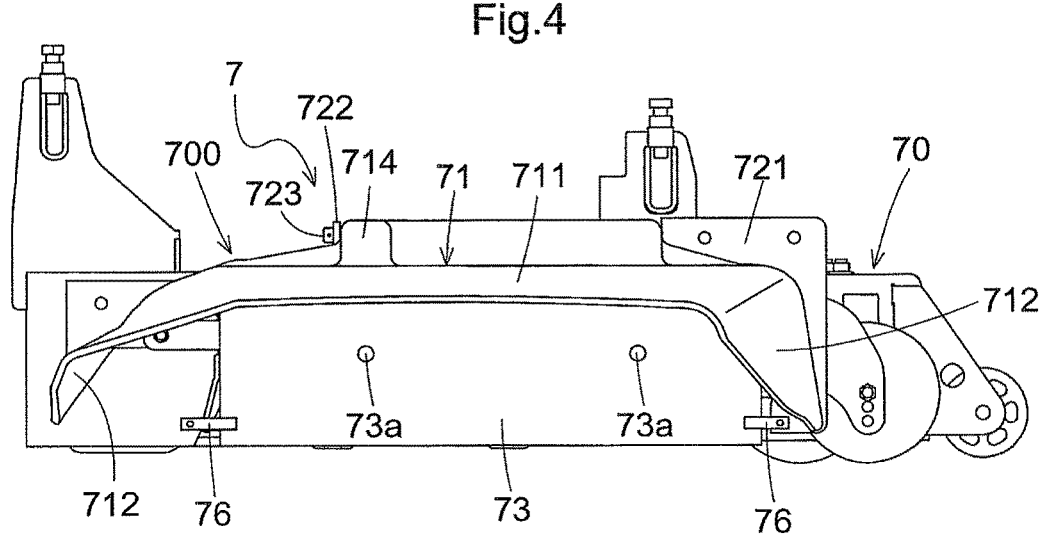
FIG. 4 is a right side view of the discharge shroud device with the blocking plate being at a closed position.

As shown in FIG. 7, the blocking plate 73 is attached to the cover element 71 to be swingable between an open position in which the discharge opening 70c is opened (see FIG. 3) and a closed position in which the discharge opening 70c is closed (see FIG. 4). The blocking plate 73 is connected to the cover element 71 through a living hinge 74, which means that the blocking plate 73 is formed integrally with the cover element 71. The living hinge 74 includes a plurality of, preferably several, living hinge pieces spaced apart from each other. Each living hinge piece may be formed as a thin rectangle to be easily bendable, for example, but may be formed otherwise in various ways.

The open-position fixing element 75 maintains the blocking plate 73 in the open position. In an example as shown in FIG. 7, the open-position fixing element 75 has a snap-fit structure formed of a snap pin 73a, which is an engaging projection formed on a surface of the blocking plate 73, and a snap hole 71a, which is an engaged hole formed in the mower deck 70. Further, a closed-position fixing element 76 is provided to maintain the blocking plate 73 in the closed position. In the example as shown in FIG. 7, the closed-position fixing element 76 is a well-known pivotable lever stop, but may have any other structure including the snap-fit structure.

In the above embodiment, the blocking plate 73 is connected to the cover element 71 to be swingable via the living hinge and formed integrally with the cover element 71. Instead, the blocking plate 73 may be separate from the cover element 71 to be swingable relative to the cover element 71 via a hinge shaft or a hinge projection.

In the above embodiment, the cover element 71 is attached to the mower deck 70 via the shroud support unit 72 having the hinge structure to be vertically pivotable. Instead, the cover element 71 may be fixed to the mower deck through a bolt, for example. In that case, the shroud support unit 72 includes a bolt and a bolt bore. Further, the shroud support unit 72 may be formed of a quick coupler, for example.

The arrangement disclosed in any one of the above embodiments may be used in combination with the other of the above embodiments unless they are contradictory to each other.

It is noted that the foregoing embodiments have been provided merely for the purpose of explanation and are in no way to be construed as limiting the disclosure, and various variations and modifications may be possible without departing from the scope of the appended claims.

What is claimed is:

1. A discharge shroud device for a side discharge mower deck, the shroud device comprising:
    a cover element extending outward from a side of the mower deck for covering a discharge opening defined at the side of the mower deck, the cover element comprising a hinge bearing element;
    a shroud support unit for attaching the cover element to the mower deck, the shroud support unit comprising a hinge bearing element;
    the hinge bearing element of the shroud support unit and the hinge bearing element of the cover element being constructed and arranged to cooperate in pivotal relationship when connected with each other through a hinge shaft element;
    a blocking plate provided in the cover element to be swingable between an open position in which the discharge opening is opened and a closed position in which the discharge opening is closed; and
    an open-position fixing element provided between the cover element and the blocking plate to fix the blocking plate at the open position,
    wherein the blocking plate is attached to the cover element through a living hinge, and all of the cover element, the hinge bearing element of the cover element, the blocking plate, and the open position fixing element are formed as an integral piece.

2. The shroud device according to claim 1, wherein the open-position fixing element has a snap-fit structure including a snap pin and a snap hole for receiving the snap pin.

3. The shroud device according to claim 2, wherein the snap pin is formed in the blocking plate, and the snap hole is formed in the cover element.

4. The shroud device according to claim 1 further comprising a closed-position fixing element provided between the blocking plate and the mower deck for fixing the blocking plate at the closed position.

5. A discharge shroud device for a side discharge mower deck, the shroud device comprising:
    a cover element extending outward from a side of the mower deck for covering a discharge opening defined at the side of the mower deck the cover element comprising a hinge bearing element;
    a shroud support unit for attaching the cover element to the mower deck, the shroud support unit comprising a hinge bearing element;
    a hinge bearing element provided in the cover element
    the hinge bearing element of the shroud support unit and the hinge bearing element of the cover element being constructed and arranged to cooperate in pivotal relationship when connected with each other through a hinge shaft element;
    a blocking plate provided in the cover element to be swingable between an open position in which the discharge opening is opened and a closed position in which the discharge opening is closed; and
    an open-position fixing element provided between the cover element and the blocking plate to fix the blocking plate at the open position,
    wherein all of the cover element, the hinge bearing element of the cover element, the blocking plate, and the open position fixing element are formed as an integral piece.

6. The shroud device according to claim 5, wherein the open-position fixing element has a snap-fit structure including a projection and a corresponding recess for receiving the projection.

7. The shroud device according to claim 6, wherein the open-position fixing element comprises a snap pin and a snap hole for receiving the snap pin.

8. The shroud device according to claim 7, wherein the snap pin is formed in the blocking plate, and the snap hole is formed in the cover element.

9. The shroud device according to claim 5 further comprising a closed-position fixing element provided between the blocking plate and the mower deck for fixing the blocking plate at the closed position.

10. The shroud device according to claim 1 wherein the hinge bearing element of the cover element comprises at least one boss having an opening cooperating with the hinge shaft element.

11. The shroud device according to claim 5 wherein the hinge bearing element of the cover element comprises at least one boss having an opening cooperating with the hinge shaft element.

12. The shroud device according to claim 1, wherein the hinge bearing element of the shroud support unit comprises at least one bracket having an opening cooperating with the hinge shaft element.

13. The shroud device according to claim 5, wherein the hinge bearing element of the shroud support unit comprises at least one bracket having an opening cooperating with the hinge shaft element.

* * * * *